United States Patent [19]

Takatsuki et al.

[11] 4,321,429
[45] Mar. 23, 1982

[54] APPARATUS FOR SELECTING TERMINAL EQUIPMENT IN TELEPHONE LINES

[75] Inventors: Toshiharu Takatsuki, Tokyo; Ken-ichi Fujiwara, Amagasaki; Sinobu Yanagisawa, Amagasaki; Shigeru Okamura, Amagasaki, all of Japan

[73] Assignees: Mitsubishi Denki Kabushiki Kaisha; Nippon Telegraph and Telephone Public Corporation, both of Tokyo, Japan

[21] Appl. No.: 85,612

[22] Filed: Oct. 17, 1979

[30] Foreign Application Priority Data

Oct. 20, 1978 [JP] Japan .................. 53-129079

[51] Int. Cl.³ .......................................... H04M 11/06
[52] U.S. Cl. .................................................. 179/2 DP
[58] Field of Search ................. 179/2 AM, 2 R, 2 A, 179/2 DP, 3, 84 R; 340/150, 151

[56] References Cited

U.S. PATENT DOCUMENTS 3,941,939  3/1976  Holmes et al. ............... 179/84 R
4,002,837  1/1977  Ebner et al. ................. 179/2 AM
4,022,977  5/1977  Nomura ........................ 179/2 AM

OTHER PUBLICATIONS

"Days of Decision are Here for Utility Remote Meter Reading", by Richard Martin, Pipeline and Gas Journal, Apr. 1972, pp. 23–28.

Primary Examiner—Bernard Konick
Assistant Examiner—J. A. Popek
Attorney, Agent, or Firm—Oblon, Fisher, Spivak, McClelland & Maier

[57] ABSTRACT

An apparatus for selectively granting priority use of telephone lines to a telephone or data transmitter each connected via the telephone lines to an exchange center. Access of the data transmitted to the exchange center is typically enabled by application of DC voltage of a predetermined polarity to the telephone lines by a control circuit. A current detection circuit is provided in series with the telephone for detecting when the telephone lines are providing current to the telephone during a time when the date transmitter is transmitting or receiving data via the telephone lines. In the event that the current detection circuit detects a current component on the telephone lines to the telephone, application of power to the data transmitter is stopped and priority use of the telephone lines is granted to the telephone.

4 Claims, 2 Drawing Figures

APPARATUS FOR SELECTING TERMINAL EQUIPMENT IN TELEPHONE LINES

BACKGROUND OF THE INVENTION

1. Field of the Invention

The present invention relates to an apparatus for selecting a terminal equipment in telephone lines connecting a telephone and a data transmitter at terminals by detecting the off-hook operation of the telephone during the operation of the data transmitter whereby the data transmitter is stopped and the telephone is selected to connect it to an exchange center.

2. Description of the Prior Arts

The circuit structure of the conventional apparatus is shown in FIG. 1.

In FIG. 1, the reference numeral (1) designates a network control unit (hereinafter referring to as NCU); (2) designates a data terminal equipment (hereinafter referred to as DTE) which is actuated by NCU (1); and (3) designates a telephone (TEL); (11) designates a circuit for detecting a NCU actuating signal (detection of calling); (12) designates a receiving relay which is self-sustaining by the output of the calling detection circuit (11); ra and rb respectively represent relay contacts; (21) designates an encoder-decoder circuit (CODEC); (22) designates a modulator-demodulator circuit (MODEM); (23) designates a constant voltage circuit (AVR).

The telephone lines $L_1$, $L_2$ are respectively connected to an exchange center (not shown). The exchange center comprises a DC power source for feeding power to the telephone lines $L_1$, $L_2$ and a switch for inversion of the output voltage of the DC power source.

The operation of the conventional apparatus will be illustrated.

The actuation of DTE (2) is carried out as follows.

The diode $D_1$ is turned on to connect NCU (1) to the power source, by the inversion of the telephone lines $L_1$ and the $L_2$ (plus at $L_2$ side) which is caused by a calling signal from the exchange center. Then, the calling signal is input through the coupling capacitor $C_1$ into the calling detection circuit (11). The calling signal is detected by the calling detection circuit (11) to turn on its output transistor. Then, the transistor $TR_1$ is turned on to actuate the receiving relay (12). When the receiving relay (12) is once actuated, the self-sustaining current is fed to the relay contact rb thereof whereby the operation can be continued.

During the period of actuating the receiving relay (12), power is fed to DTE (2) and MODEM (22) is connected to the lines so as to be capable of transmission and receiving.

When an off-hook of the telephone (3) is carried out during the period of actuating DTE (2) (hook switch HS in the closing state), a step for detecting the off-hook state to stop the operation of DTE (2) is as follows. That is, the current consumed in NCU (1) and DTE (2) is remarkably smaller than the telephone current of the telephone (3). When the off-hook of the telephone (3) is carried out, the receiving relay (12) is returned to stop the operation of DTE (2) under the condition of an apparent short-circuit between the power input terminals of NCU (1) and DTE (2) as produced by the low resistance of the telephone (3).

The conventional apparatus has said structure. Thus, it is necessary to control precisely the coil current of the receiving relay (12) in the range of a non-induction current during the period of the off-hook of the telephone (3).

However, several phenomena have been observed, as follows:

(a) a fluctuation of the voltage between the terminals of the telephone is large during the period of the off-hook of the telephone because of the fluctuation of the line impedance.

(b) A fluctuation of the non-induction current of the relay is large.

(c) The current consumed by NCU (1) and DTE (2) should be remarkably small.

It has been difficult to attain stable operation because of said reasons.

SUMMARY OF THE INVENTION

The present invention is provided to overcome said disadvantages of the conventional apparatus and to provide an appartus for selecting a terminal equipment in the telephone line wherein the telephone current passed through the telephone is detected and the operation of the data transmitter is stopped by the detected current output to select the telephone.

The apparatus of the present invention comprises a current detection circuit for detecting the current of the telephone during the operation of the data transmitter and a control circuit for stopping the application of power to the data transmitter depending upon the output of the current detection circuit.

In a preferable embodiment, the current detection circuit is a photo-coupler and the switch of the control circuit is closed by an output of the photo-coupler, and the data transmitter operation is stopped by the closing of the switch.

DETAILED DESCRIPTION OF THE PREFERED EMBODIMENTS

Figure 2:
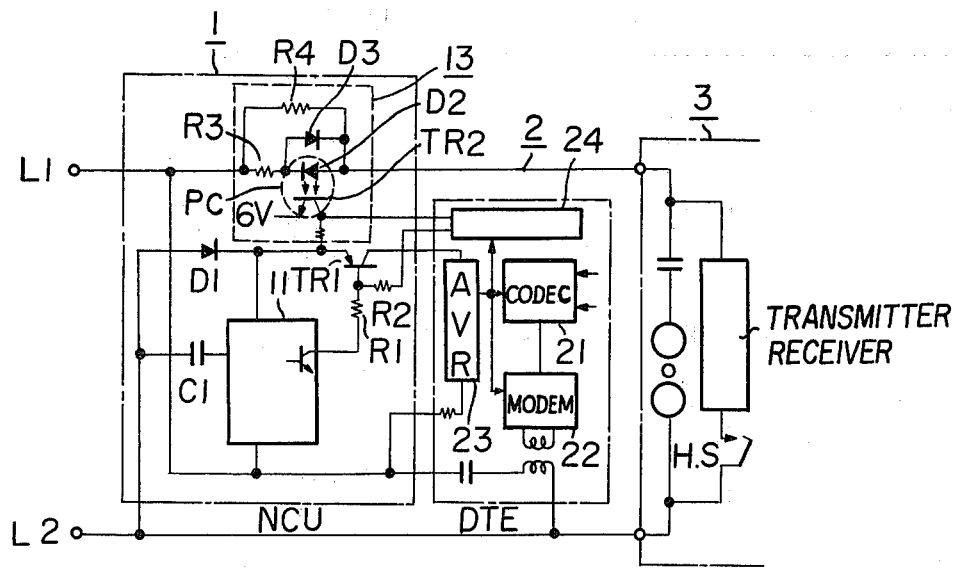
FIG. 2 is a circuit diagram of one embodiment of the present invention.

Referring to FIG. 2, one embodiment of the present invention is nextly illustrated.

In FIG. 2, the reference numeral (1) designates NCU; (2) designates DTE actuated by NCU (1); (3) designates a telephone (TEL); (11) designates a circuit for detecting NCU actuating signal (calling detection circuit); (13) designates an off-hook current detection circuit for detecting the telephone current passed during the off-hook period; (21) designates a code decoder (CODEC) for transmitting and receiving data; (22) designates modulator-demodulator (MODEM); (23) designates a constant voltage circuit (AVR); and (24) designates an initializing circuit.

The operation of the embodiment will be illustrated.

The actuation of DTE (2) is carried out as follows.

Figure 1:
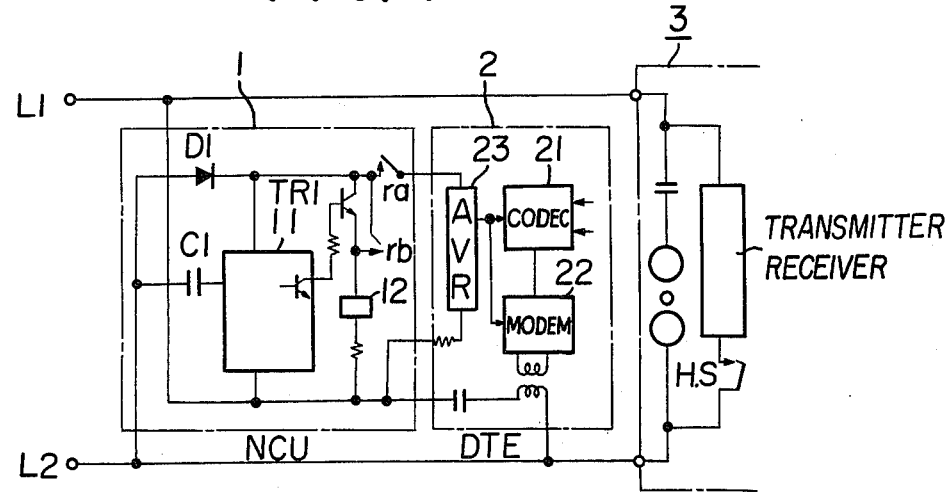
FIG. 1 is a circuit diagram of the conventional apparatus for selecting a terminal equipment in telephone lines.

The diode $D_1$ is turned on by an inversion on the lines $L_1$, $L_2$ (plus at $L_2$ side) caused by a calling signal from the exchange center whereby NCU (1) is connected to the power source. The calling signal is input through a coupling capacitor $C_1$ into the calling detection circuit (11). The calling signal is detected by the calling detection circuit (11) to turn on its output transistor. These operations are the same in the apparatus shown in FIG. 1.

In the embodiment of the present invention, the current is passed from the line $L_2$ through the diode $D_1$, the initializing circuit (24) of DTE (2), the resistors $R_1$, $R_2$ and the output transistor of the calling detection circuit to the line $L_1$ because of the turn-on of the output transistor of the calling detection circuit (11). The potential at the function of the resistors $R_1$, $R_2$ connected to the base of the transistor $TR_1$ is decreased by the current whereby the base current is passed and the transistor $TR_1$ is turned on to connect DTE (2) to the power source. Initializing circuit (24) may be implemented by means of power-on reset/run circuits of the type disclosed by Clark, "Power-On Reset/Run Circuits for the RCA CDP1802 COSMAC Microprocessor", RCA Application Note ICAN-6581, February 1977, for example by means of the CD 4093 Quad 2-Input NAND gate in circuit connection with an RS flip-flop. The initializing circuit (24) of DTE (2) performs CODEC initialization for the transition of application of the power source to DTE (2) and simultaneously, functions to the base current of the transistor $TR_1$ through the resistor $R_2$ so as to continuously feed current to DTE (2). During the period of feeding power to DTE (2), the modulator-demodulator circuit (22) is connected to the lines $L_1$, $L_2$ so as to be capable of the transmission and the receiving of the data of DTE (2). When the off-hook operation of the telephone (3) is carried out during the operation of DTE (2), this fact is detected to stop the operation of DTE (2) by the following steps. That is, the current is passed through the light emitting diode $D_2$ of the photo-coupler PC by the off-hook of the telephone (3) and the phototransistor $TR_2$ is turned on to reset the initializing circuit of DTE (2). Thus, the base current of the transistor $TR_1$ fed through the resistor $R_2$ is interrupted by the reset so as to turn off the transistor $TR_1$. As a result, the operation of DTE (2) is stopped by the interruption of the power source.

The diode $D_3$ is provided to protect against the reverse voltage of the light emitting diode $D_2$ and the resistor $R_3$ is provided to protect against overcurrent of the light emitting diode $D_2$ and the resistor $R_4$ is a shunt resistor.

In said embodiment, DTE (2) is connected to NCU (1). Thus, DTE (2) can be any equipment, such as a facsimile used in conjunction with telephone lines where priority of operaton is assigned to a telephone set coupled to the telephone line.

In above described embodiment, the output of the off-hook current detection circuit (13) is connected so as to interrupt the base current of the transistor switch for feeding power to DTE (2) whereby the operation of DTE (2) is stopped. Thus, the output of the off-hook current detection circuit (13) can be connected in various other ways.

In accordance with the present invention, the telephone current passed upon the occurence off-hook of the telephone is detected and the operation of the data transmitter is stopped by the detected output to close the telephone line and accordingly, the off-hook of the telephone can be detected without any impact on the telephone line network and the selection (switching) of the telephone line can be precisely attained.

We claim:

1. In an apparatus for selectively granting priority use of telephone lines to a telephone or a data transmitter each connected via said telephone lines at the same line terminals to an exchange center, the improvement comprising:
   current detection means connected in series with said telephone for detecting when said telephone lines are providing current to said telephone during a time when said data transmitter is transmitting or receiving data via said telephone lines; and
   control circuit means coupled to said current detection means for stopping the application of power to said data transmitter upon detection of a current component on said telephone lines to said telephone by said current detection means;
   whereby priority use of said telephone lines is granted to said telephone whenever telephone current is detected.

2. An apparatus according to claim 1 wherein said current detection means comprises:
   a photo-coupler.

3. An apparatus according to claim 2 wherein;
   said control circuit comprises a switch; and
   said data transmitter has power applied thereto from the telephone lines by turning on or off the switch of said control circuit.

4. An apparatus according to claim 3 wherein said switch of said control circuit is turned on or off by the output of said photo-coupler.

* * * * *